UNITED STATES PATENT OFFICE.

PHILEAS A. RACICOT, OF LOWELL, MASSACHUSETTS.

PROCESS FOR THE MANUFACTURE OF HYDROFLUOSILICIC ACID.

1,175,294.  Specification of Letters Patent.  Patented Mar. 14, 1916.

No Drawing.  Application filed March 12, 1915. Serial No. 13,985.

*To all whom it may concern:*

Be it known that I, PHILEAS A. RACICOT, a citizen of the United States, residing at Lowell, in the county of Middlesex and State of Massachusetts, have invented a new and useful Improvement in Processes for the Manufacture of Hydrofluosilicic Acid, of which the following is a specification.

This invention relates to the process of producing hydrofluosilicic acid from silicon tetrafluorid gas by spraying this gas with a solution of hydrofluoric acid, or by mixing silicon tetrafluorid gas with hydrofluoric acid gas, and spraying the mixture with water. This process has for its object the production of hydrofluosilicic acid by a cheaper and more expeditious means and procuring a product more free from impurities than by any process now used and utilizing for commercial purposes the silicon tetrafluorid which is a by-product of acid phosphate manufacture now a more or less noxious waste.

In the course of the manufacture of fertilizers, acid phosphate is commonly used. This acid phosphate is manufactured extensively in all plants producing fertilizers by treating phosphate rock, so-called, with strong sulfuric acid, one of the reactions producing the silicon tetrafluorid gas which escapes and is now usually disposed of by being carried away from acid phosphate mixing dens by means of flues and fans and expelled into the air or destroyed by running it through water towers. Its action is harmful to vegetation. It has a pungent odor and its effect on the human system is poisonous. This invention would, therefore, have the incidental purpose and effect of lessening the expense of disposing of this undesirable by-product and providing an efficient means for abating a common nuisance in communities in which fertilizer plants are operating and mitigating the danger to health of workmen and other members of the community in which fertilizers are manufactured.

There are two other processes now in use for producing hydrofluosilicic acid; first, the process of spraying silicon tetrafluorid gas with water. This produces a much smaller quantity than the process herein described with the same amount of labor and time, and has the further disadvantage of necessarily producing silicic acid at the same time, which must be separated by a further process from hydrofluosilicic acid. Second: percolating hydrofluoric acid through silica (quartz sand). This process is more expensive, and slower and in order to procure an equally pure product, considerable settling is necessary.

I claim:

The process of manufacturing hydrofluosilicic acid consisting in introducing silicon tetrafluorid gas into a containing apparatus and mixing the same with hydrofluoric acid gas introduced into the same container and subjecting said gases so mixed to the action of water.

PHILEAS A. RACICOT.

Witnesses:
CHARLES J. MARTELL,
ALICE S. CASSIDY.